(12) United States Patent
Kawashima et al.

(10) Patent No.: US 11,996,743 B2
(45) Date of Patent: May 28, 2024

(54) ROTOR MANUFACTURING METHOD (71) Applicant: AISIN CORPORATION, Aichi (JP)

(72) Inventors: Takaaki Kawashima, Kariya (JP); Yutaka Hara, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/632,626

(22) PCT Filed: Mar. 25, 2020

(86) PCT No.: PCT/JP2020/013476
§ 371 (c)(1),
(2) Date: Feb. 3, 2022

(87) PCT Pub. No.: WO2021/192122
PCT Pub. Date: Sep. 30, 2021

(65) Prior Publication Data
US 2022/0294321 A1    Sep. 15, 2022

(51) Int. Cl.
*H02K 15/03*    (2006.01)

(52) U.S. Cl.
CPC ........ *H02K 15/03* (2013.01); *Y10T 29/49012* (2015.01)

(58) Field of Classification Search
CPC ........ H02K 15/02; H02K 15/03; H02K 7/003; F16D 1/12; F16D 3/06; B23P 19/02; Y10T 29/49012
USPC .................. 29/598, 596, 604, 609, 732, 738
See application file for complete search history.

(56) References Cited

U.S. PATENT DOCUMENTS

| 2014/0097711 A1 | 4/2014 | Kubes | |
| 2014/0326090 A1* | 11/2014 | Kisa | B21D 26/033 |
| | | | 74/89.23 |

FOREIGN PATENT DOCUMENTS

| DE | 10 2018 115244 A1 | 8/2018 | |
| JP | 2001-268858 A | 9/2001 | |
| KR | 101271950 | * 6/2013 | ............... H02K 1/22 |
| KR | 101271950 B1 | 6/2013 | |
| KR | 2015 0059668 A | 6/2015 | |
| WO | 2019/0224552 A1 | 11/2019 | |

OTHER PUBLICATIONS

Jun. 16, 2020 International Search Report issued in International Patent Application No. PCT/JP2020/013476.
May 22, 2023 Office Action issued in European Patent Application No. 20927127.9.

* cited by examiner

*Primary Examiner* — Thiem D Phan
(74) *Attorney, Agent, or Firm* — Oliff PLC (57) ABSTRACT

The rotor manufacturing method includes the step of fixing a shaft to a rotor core by hydroforming. The shaft has a cylindrical shape in which an inside diameter of a first portion of the shaft to be placed on an inner peripheral surface of a shaft insertion hole is larger than an inside diameter of a second portion of the shaft located on one side in a rotation axis direction relative to the first portion.

16 Claims, 9 Drawing Sheets

ROTOR MANUFACTURING METHOD

TECHNICAL FIELD

The present disclosure relates to rotor manufacturing methods.

BACKGROUND ART

A rotor manufacturing method known in the related art involves fixing a shaft to an inner peripheral surface of a rotor core. Such an armature is disclosed, for example, in Japanese Unexamined Patent Application Publication No. 2001-268858 (JP 2001-268858 A).

JP 2001-268858 A discloses a method for manufacturing a motor rotor including: a hollow rotary shaft having a pipe structure; and a laminated core whose inner peripheral surface has the rotary shaft fixed thereto. The manufacturing method involves placing the rotary shaft having constant outside diameter, inside diameter, and thickness, such that the rotary shaft is located radially inward of the laminated core. With portions of the rotary shaft exposed externally, the rotary shaft is fixed to a forming die of a hydroformer. The manufacturing method then involves performing a hydroforming process to increase the internal pressure of the rotary shaft by injecting a liquid into an entire internal space of the rotary shaft. As a result, a portion of the rotary shaft facing the laminated core is expanded (or plastically deformed) and thus fixed to the laminated core. In addition, the externally exposed portions of the rotary shaft are expanded beyond the inside diameter of the laminated core so as to provide disconnection stoppers. The number of disconnection stoppers provided is two such that the laminated core is interposed between the disconnection stoppers in an axial direction of the laminated core.

RELATED ART DOCUMENTS

Patent Documents

Patent Document 1: JP 2001-268858 A

SUMMARY OF THE DISCLOSURE

Problem to be Solved by the Invention

For a rotary shaft of a motor rotor, a bearing member is usually placed to support the rotary shaft such that the rotary shaft is rotatable. In order for the rotary shaft to be rotatably supported by the bearing member, the dimensional accuracy of a portion of the rotary shaft around which the bearing member is to be placed presumably needs to be higher than the dimensional accuracy of a portion of the rotary shaft to be fixed to a laminated core. For the motor rotor disclosed in JP 2001-268858 A, a portion of the rotary shaft around which a bearing member is to be placed is presumably located axially outward of the disconnection stoppers. The motor rotor manufacturing method disclosed in JP 2001-268858 A, however, involves performing a hydroforming process to increase the internal pressure of the rotary shaft by injecting a liquid into the entire internal space of the rotary shaft, with the rotary shaft (which has constant outside diameter, inside diameter, and thickness) located radially inward of the laminated core. As a result, the portion of the rotary shaft facing the laminated core is expanded (or plastically deformed) and thus fixed to the laminated core. Accordingly, when the portion of the rotary shaft facing the laminated core is fixed to the laminated core, an internal pressure produced by the liquid is applied also to the portion of the rotary shaft around which the bearing member is to be placed. This may unfortunately cause the portion of the rotary shaft around which the bearing member is to be placed to expand (or plastically deform) inside a die member, resulting in changes in the dimensions of the portion of the rotary shaft around which the bearing member is to be placed. Consequently, because of performing hydroforming, the manufacturing method disclosed in JP 2001-268858 A disadvantageously decreases the dimensional accuracy of the portion of the rotary shaft around which the bearing member is to be placed.

Conceivable measures to prevent a decrease in the dimensional accuracy of the portion of the rotary shaft around which the bearing member is to be placed include increasing the radial thickness of an entirety of the rotary shaft so as to enhance the rigidity of the entirety of the rotary shaft. In other words, enhancing the rigidity of the entirety of the rotary shaft may make it unlikely that the portion of the rotary shaft around which the bearing member is to be placed will plastically deform. An increase in the radial thickness of the entirety of the rotary shaft, however, may require an increase in hydroformer-produced pressure necessary to expand the rotary shaft such that the portion of the rotary shaft facing the laminated core is fixed to the laminated core. As a consequence, the hydroformer (or a rotor manufacturing apparatus) unfortunately increases in size in order to prevent a decrease the dimensional accuracy of the portion of the rotary shaft (or a shaft) around which the bearing member is to be placed, i.e., a portion of the rotary shaft located on one side in a rotation axis direction relative to a shaft insertion hole.

This disclosure has been made to solve the problems mentioned above, and an object of this disclosure is to provide a rotor manufacturing method that would be able to prevent a decrease in the dimensional accuracy of a portion of a shaft located on one side in a rotation axis direction relative to a shaft insertion hole while keeping a rotor manufacturing apparatus from increasing in size, if the method involves performing hydroforming.

Means for Solving the Problem

To achieve the above object, a rotor manufacturing method according to one aspect of the disclosure involves fixing a shaft to an inner peripheral surface of a shaft insertion hole of a rotor core including a plurality of annular electromagnetic steel sheets stacked in a rotation axis direction such that the shaft insertion hole is defined. The rotor manufacturing method includes the steps of: providing the shaft having a cylindrical shape in which an inside diameter of a first portion of the shaft to be placed on the inner peripheral surface of the shaft insertion hole is larger than an inside diameter of a second portion of the shaft located on one side in the rotation axis direction relative to the first portion; inserting the shaft into the shaft insertion hole by axially moving at least one of the shaft and the rotor core such that an outer periphery of the first portion of the shaft radially faces the inner peripheral surface of the shaft insertion hole; and fixing the shaft to the rotor core by a hydroforming process that involves filling an internal space of the shaft with a fluid and expanding the shaft with an internal pressure produced by the fluid, thus pressure-welding the first portion to the inner peripheral surface of the shaft insertion hole after the step of inserting the shaft.

When an internal space of a cylindrical shaft is filled with a fluid and the shaft is expanded by an internal pressure produced by the fluid, a circumferential stress $\sigma_\theta$ applied to the shaft is representable by the following relational expression (1):

$$\sigma_\theta = (P \times D)/t \quad (1)$$

where P denotes a pressure (internal pressure), D denotes an inside diameter, and t denotes a thickness.

Accordingly, as indicated by the relational expression (1), the circumferential stress $\sigma_\theta$ applied to the shaft has a tendency to increase as the inside diameter D increases and to decrease as the inside diameter D decreases. Focusing attention on this tendency, the inventors of the present application have developed the rotor manufacturing method according to the above aspect, which includes the step of providing the shaft having a cylindrical shape in which the inside diameter of the first portion of the shaft to be placed on the inner peripheral surface of the shaft insertion hole is larger than the inside diameter of the second portion of the shaft located on one side in the rotation axis direction relative to the first portion. Because the inside diameter of the first portion is larger than the inside diameter of the second portion, a circumferential stress applied to the first portion of the shaft will be greater than a circumferential stress applied to the second portion accordingly. Thus, when the internal pressure produced by the fluid is increased to a predetermined pressure by a hydroformer, the same internal pressure is applied to the first portion and the second portion, which makes it likely that the first portion having a relatively large inside diameter will expand (or deform) to a greater degree than the second portion. In other words, the second portion having a relatively small inside diameter is unlikely to deform (or plastically deform) to a greater degree than the first portion. As a result, the rotor manufacturing method is able to make the second portion less prone to deform without increasing the radial thickness of an entirety of the shaft. Consequently, if the rotor manufacturing method involves performing hydroforming, the rotor manufacturing method would be able to prevent a decrease in the dimensional accuracy of the second portion (which is a portion of the shaft located on one side in the rotation axis direction relative to the shaft insertion hole) while keeping a rotor manufacturing apparatus from increasing in size.

Effects of the Invention

As described above, the present disclosure would be able to prevent a decrease in the dimensional accuracy of a portion of a shaft located on one side in a rotation axis direction relative to a shaft insertion hole while keeping a rotor manufacturing apparatus from increasing in size, if hydroforming is to be performed.

MODES FOR CARRYING OUT THE DISCLOSURE

Embodiments of the present disclosure will be described below with reference to the drawings.

Structure of Rotor According to First Embodiment

Figure 1:
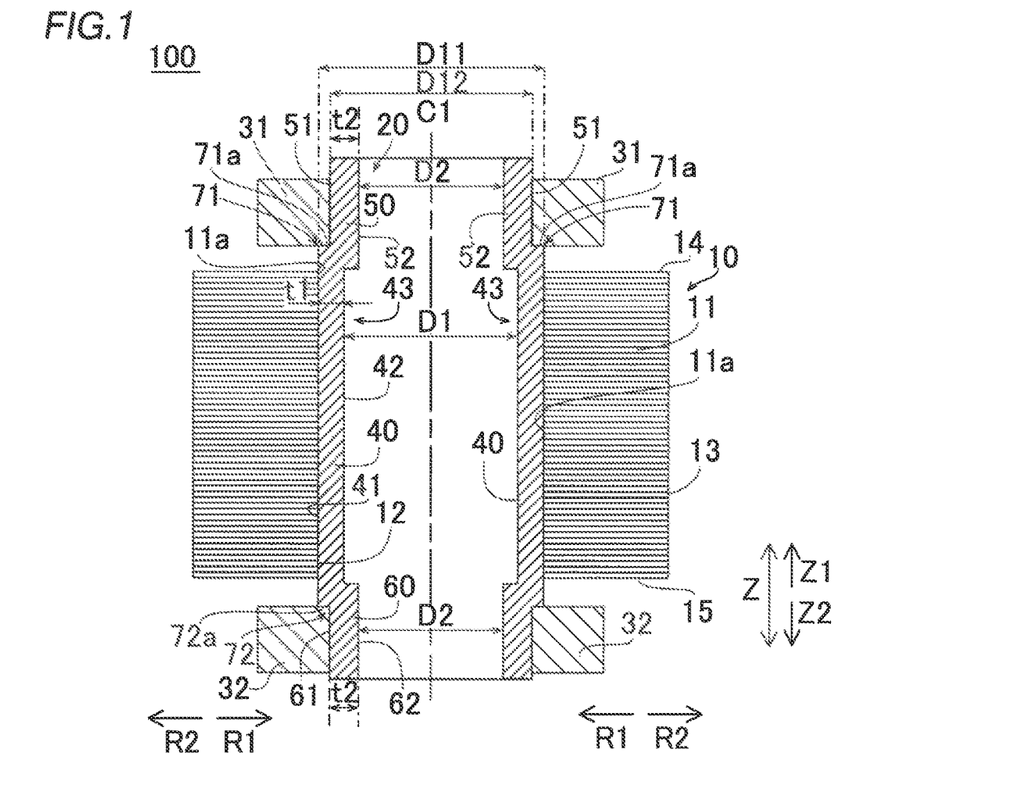
FIG. 1 is a cross-sectional view of a rotor according to a first embodiment, taken along an axial direction of the rotor.
Figure 2:
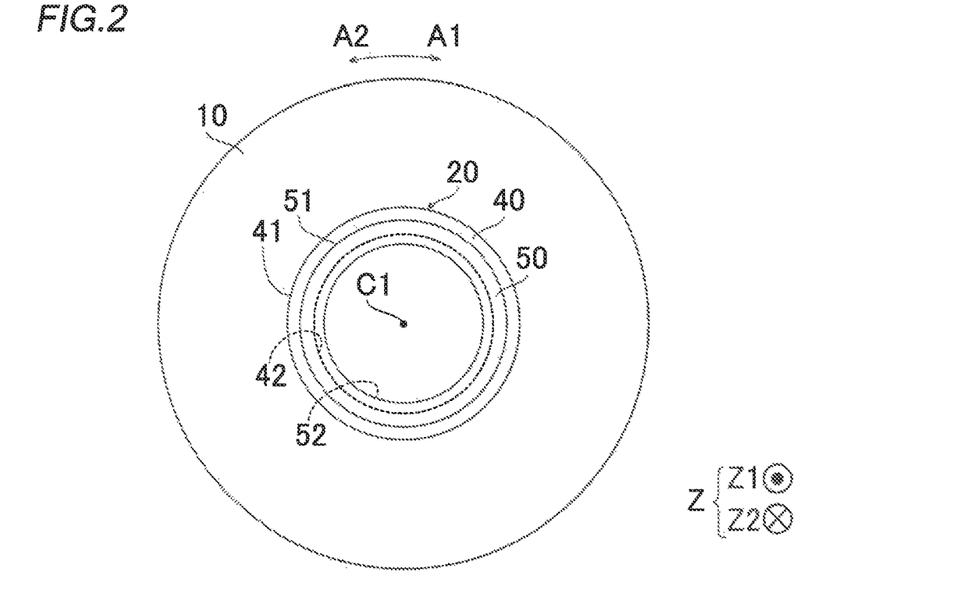
FIG. 2 is a schematic plan view of the rotor according to the first embodiment.

Referring to FIGS. 1 and 2, a structure of a rotor 100 according to a first embodiment will be described. The rotor 100 is combined with a stator (not illustrated) so as to provide a rotary electric machine.

As used herein, the terms "axial direction" and "rotation axis direction" each refer to a direction along a rotation axis (which is denoted by the reference sign C1 and corresponds to a direction Z1 and a direction Z2) of the rotor 100 (see FIG. 1). The term "radially inward" refers to a direction (i.e., a direction R1) toward the rotation axis C1 of the rotor 100. The term "radially outward" refers to a direction (i.e., a direction R2) outward from the rotor 100. The term "circumferential direction" refers to a circumferential direction (i.e., a direction A1 and a direction A2) of the rotor 100 as illustrated in FIG. 2.

As illustrated in FIG. 1, the rotor 100 includes a rotor core 10, a shaft 20, and bearing members 31 and 32. The rotor core 10 includes a plurality of electromagnetic steel sheets 11 stacked in an axial direction such that a hole 11a is defined therein. The electromagnetic steel sheets 11 are, for example, silicon steel plates. The rotor core 10 has a cylindrical shape whose central axis corresponds to the rotation axis C1. Surfaces of the electromagnetic steel sheets 11 that define an inner peripheral surface 12 of the rotor core 10 (i.e., an inner peripheral surface 12 of the hole 11a) are substantially flush with each other in the axial direction. Surfaces of the electromagnetic steel sheets 11 that define an outer peripheral surface 13 of the rotor core 10 are substantially flush with each other in the axial direction. The hole 11a is an example of a "shaft insertion hole" in the claims.

The shaft 20 has a cylindrical shape whose central axis corresponds to the rotation axis C1. The shaft 20 is made of, for example, carbon steel. The shaft 20 is fixed to the inner peripheral surface 12 of the rotor core 10. The shaft 20 includes a first portion 40 and second portions 50 and 60. The first portion 40 and the second portions 50 and 60 each have a cylindrical shape.

The first portion 40 is an axially central portion of the shaft 20 placed on the inner peripheral surface 12 of the rotor core 10. Specifically, an outer peripheral surface 41 of the first portion 40 is in abutment with the inner peripheral surface 12 of the rotor core 10. In the first embodiment, the first portion 40 is pressure-welded to the inner peripheral surface 12 of the hole 11a by hydroforming.

The first portion 40 has an inside diameter D1, an outside diameter D11, and a thickness t1. The inside diameter D1, the outside diameter D11, and the thickness t1 are each substantially constant. An inner peripheral surface 42 of the first portion 40 is located radially outward of an inner peripheral surface 52 of the second portion 50 and an inner peripheral surface 62 of the second portion 60. Accordingly, the inner peripheral surface 42 of the first portion 40 is recessed relative to the inner peripheral surface 52 of the second portion 50 and the inner peripheral surface 62 of the second portion 60. The first portion 40 is thus provided with a recess 43 recessed radially outward.

The recess 43 has the function of temporarily storing a cooling fluid that flows in the axial direction through an internal space of the shaft 20 during use of the rotor 100. The cooling fluid may be an automatic transmission fluid (ATF). The cooling fluid stored in the recess 43 thus cools the rotor core 10 through the shaft 20 during use of the rotor 100.

The second portion 50 is a portion of the shaft 20 located in the direction Z1 relative to the first portion 40. The second portion 60 is a portion of the shaft 20 located in the direction Z2 relative to the first portion 40. The second portion 50 is a portion of the shaft 20 around which the bearing member 31 is placed. The second portion 60 is a portion of the shaft 20 around which the bearing member 32 is placed.

The second portions 50 and 60 each have an inside diameter D2, an outside diameter D12, and a thickness t2. The inside diameter D2, the outside diameter D12, and the thickness t2 are each substantially constant. In the first embodiment, the inside diameter D1 is larger than the inside diameter D2, and the outside diameter D11 is larger than the outside diameter D12. The thickness t1 of the first portion 40 is substantially equal to the thickness t2 of each of the second portions 50 and 60.

A step portion 71 is provided between the outer peripheral surface 41 of the first portion 40 and an outer peripheral surface 51 of the second portion 50. A step portion 72 is provided between the outer peripheral surface 41 of the first portion 40 and an outer peripheral surface 61 of the second portion 60. Specifically, the step portion 71 defines a recess recessed radially inward from the outer peripheral surface 41 of the first portion 40 to the outer peripheral surface 51 of the second portion 50. The step portion 71 includes a surface 71a parallel to a direction perpendicular to the axial direction. The step portion 72 defines a recess recessed radially inward from the outer peripheral surface 41 of the first portion 40 to the outer peripheral surface 61 of the second portion 60. The step portion 72 includes a surface 72a parallel to a direction perpendicular to the axial direction.

The bearing member 31 is placed such that the bearing member 31 circumferentially surrounds the outer peripheral surface 51 of the second portion 50 from its radially outer side and is in contact with the surface 71a of the step portion 71. The bearing member 32 is placed such that the bearing member 32 circumferentially surrounds the outer peripheral surface 61 of the second portion 60 from its radially outer side and is in contact with the surface 72a of the step portion 72. The bearing members 31 and 32 support the shaft 20 and the rotor core 10 such that the shaft 20 and the rotor core 10 are rotatable around the rotation axis C1.

Rotor Manufacturing Method According to First Embodiment

Figure 3:
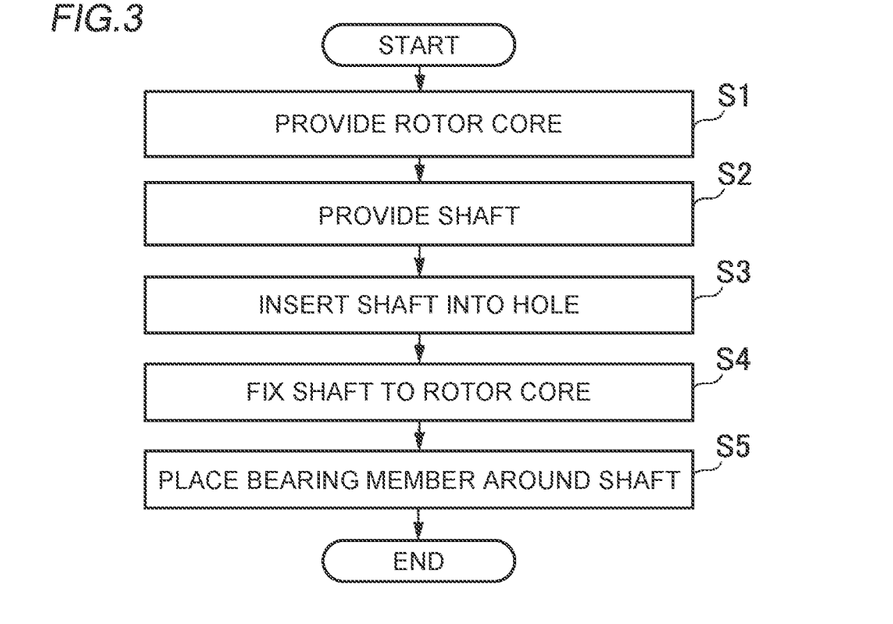
FIG. 3 is a flow chart illustrating rotor manufacturing steps according to the first embodiment.

Referring to FIGS. 3 to 9, a method for manufacturing the rotor 100 according to the first embodiment will now be described. FIG. 3 is a flow chart illustrating steps for manufacturing the rotor 100.

Figure 4:
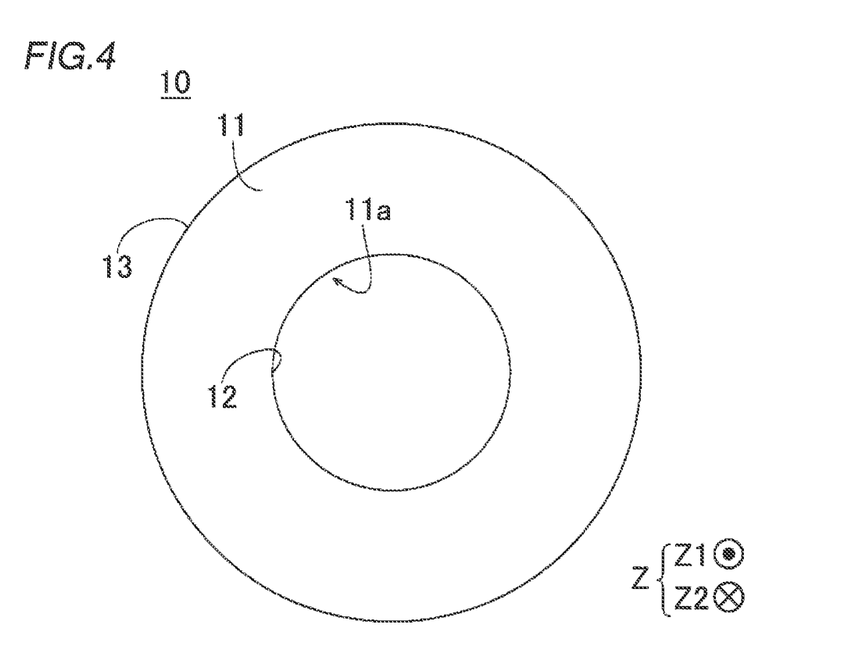
FIG. 4 is a plan view of a rotor core according to the first embodiment.

First, step S1 involves providing the rotor core 10. Specifically, a strip-shaped electromagnetic steel sheet is stamped into annular shapes in a progressive pressing apparatus (not illustrated), and the resulting electromagnetic steel sheets 11 are stacked in the rotation axis direction such that the hole 11a is defined as illustrated in FIG. 4. This provides the rotor core 10 having an annular shape (or a cylindrical shape). In the first embodiment, the electromagnetic steel sheets 11 identical to each other are stacked on top of each other, and the rotor core 10 is thus provided such that the surfaces of the electromagnetic steel sheets 11, which define the inner peripheral surface 12 of the hole 11a, are flush with each other in the rotation axis direction.

Figure 5A:
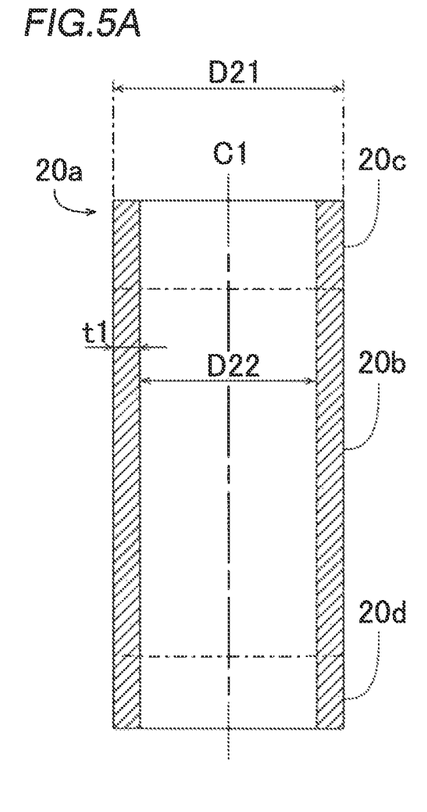
FIG. 5A is a cross-sectional view of a pre-drawing shaft (i.e., a pipe member), illustrating the step of providing a shaft according to the first embodiment.

Step S2 involves providing the shaft 20. Specifically, as illustrated in FIG. 5A, step S2 involves preparing a cylindrical pipe member 20a having the thickness t1, an outside diameter D21, and an inside diameter D22. In other words, step S2 involves preparing the pipe member 20a, with the outer peripheral surface 41 of the first portion 40, the outer peripheral surface 51 of the second portion 50, and the outer peripheral surface 61 of the second portion 60 flush with each other. The outside diameter D21 is smaller than the outside diameter D11 by a clearance CL1 (which will be described below). The inside diameter D22 is smaller than the inside diameter D1 by the clearance CL1 (which will be described below).

Figure 5B:
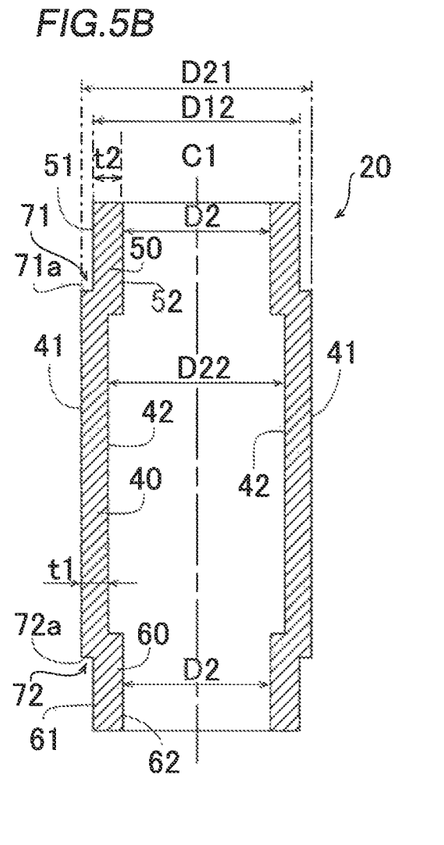
FIG. 5B is a cross-sectional view of a post-drawing shaft, illustrating the step of providing the shaft according to the first embodiment.

In the state illustrated in FIG. 5A, a surface 20b of the pipe member 20a, which will be the outer peripheral surface 41 of the first portion 40, and a surface 20c of the pipe member 20a, which will be the outer peripheral surface 51 of the second portion 50, are flush with each other. The pipe member 20a in this state is placed in a drawing apparatus (not illustrated) and subjected to drawing such that the surface 20c deforms radially inward. This provides the shaft 20 having a cylindrical shape in which the outside diameter D21 of the first portion 40 is larger than the outside diameter D12 of the second portion 50 as illustrated in FIG. 5B. The shaft 20 is further subjected to drawing such that a surface 20d, which will be the outer peripheral surface 61 of the second portion 60, deforms radially inward similarly to the surface 20c. This causes the resulting shaft 20 to have a cylindrical shape in which the inside diameter D22 of the first portion 40 is larger than the inside diameter D2 of each of the second portions 50 and 60. The radial thickness t1 of the first portion 40 is equal to or smaller than the radial thickness t2 of the second portion 50. In the first embodiment, the thickness t1 is equal to the thickness t2.

Subjecting the pipe member 20a to drawing provides the step portion 71 between the outer peripheral surface 41 of the first portion 40 and the outer peripheral surface 51 of the second portion 50, and provides the step portion 72 between the outer peripheral surface 41 of the first portion 40 and the outer peripheral surface 61 of the second portion 60. Specifically, the step portion 71 defines a recess recessed radially inward from the outer peripheral surface 41 of the first portion 40 to the outer peripheral surface 51 of the second portion 50, and includes the surface 71a parallel to a direction perpendicular to the axial direction. The step portion 72 defines a recess recessed radially inward from the outer peripheral surface 41 of the first portion 40 to the outer peripheral surface 61 of the second portion 60, and includes the surface 72a parallel to a direction perpendicular to the axial direction.

Figure 6:
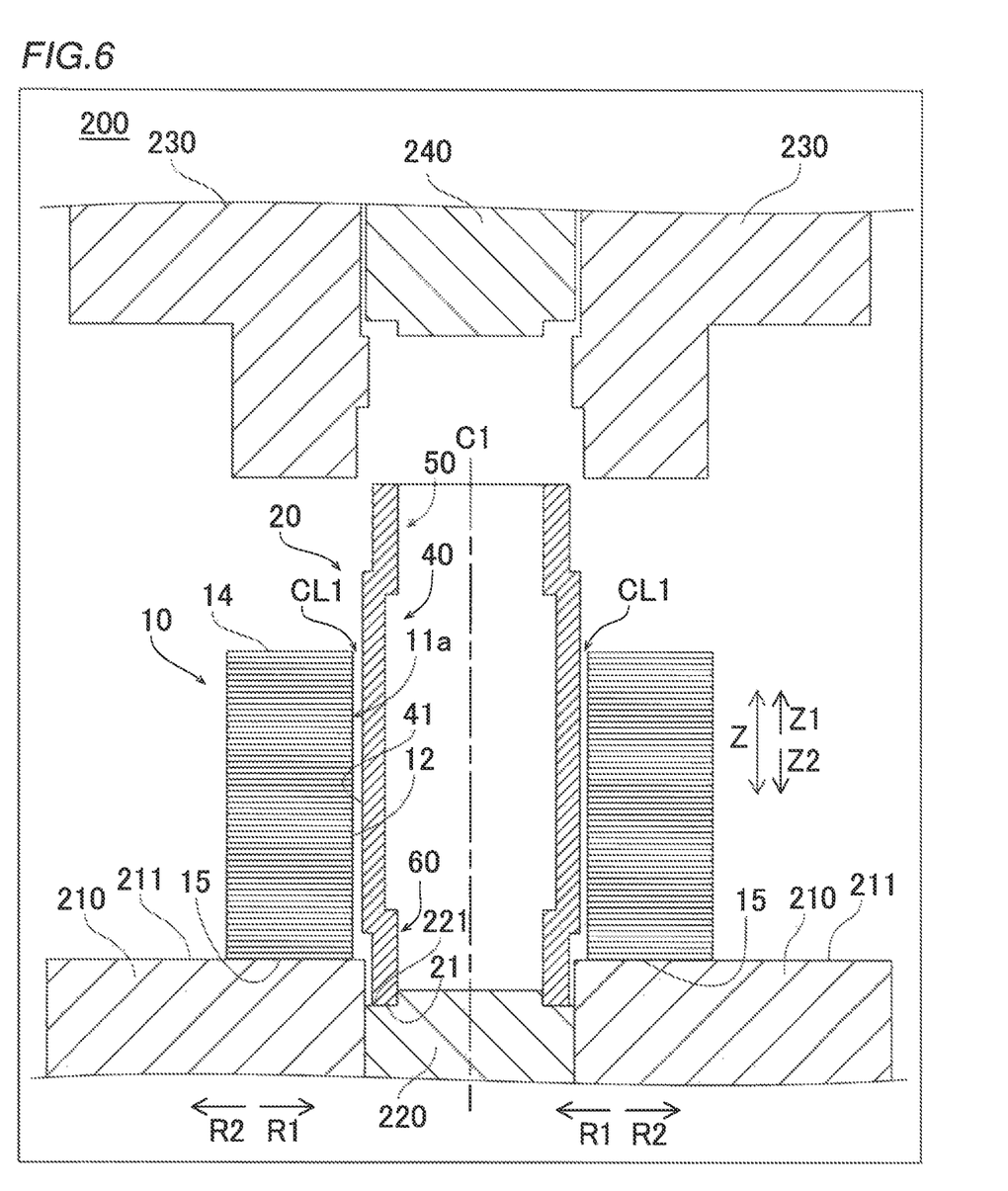
FIG. 6 is a diagram illustrating the step of inserting the shaft according to the first embodiment into a hole.

Step S3 involves inserting the shaft 20 into the hole 11a. Specifically, as illustrated in FIG. 6, the rotor core 10 is placed in a hydroformer 200 such that an end face 15 of the rotor core 10 comes into contact with an upper surface 211 of a lower die 210 of the hydroformer 200. The shaft 20 is placed over the hole 11a of the rotor core 10 (or placed in the direction Z1 relative to the hole 11a) and is then moved downward (or in the direction Z2) with respect to the rotor core 10. The shaft 20 is thus inserted into the hole 11a. The outer peripheral surface 41 of the first portion 40 of the shaft 20 radially faces the inner peripheral surface 12 of the rotor core 10, with the clearance CL1 left therebetween. A lifter 220 is placed radially inward of the lower die 210. The shaft 20 is placed on an upper surface 221 of the lifter 220 of the hydroformer 200. This brings a lower end face 21 of the shaft 20 into contact with the upper surface 221 of the lifter 220.

Step S4 involves fixing the shaft 20 to the rotor core 10. Specifically, the shaft 20 is fixed to the inner peripheral surface 12 of the hole 11a of the rotor core 10 including the annular electromagnetic steel sheets 11 stacked in the rotation axis direction such that the hole 11a is defined.

In the first embodiment, the shaft 20 is fixed to the rotor core 10 by hydroforming that involves filling the internal space of the shaft 20 with a fluid L (see FIG. 9) and expanding the shaft 20 with a pressure (internal pressure) P produced by the fluid L, thus pressure-welding the first portion 40 to the inner peripheral surface 12 of the hole 11a.

Figure 7:
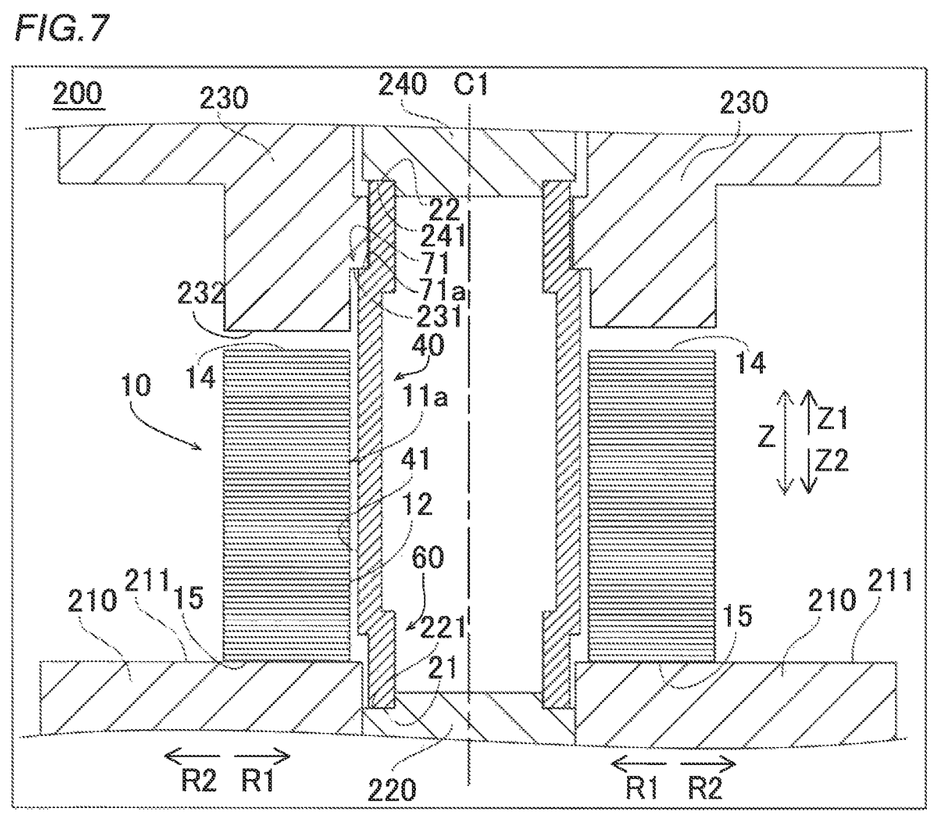
FIG. 7 is a diagram illustrating the initial step of fixing the shaft according to the first embodiment to the rotor core.

Specifically, as illustrated in FIG. 6, a pressing member 230 and a seal punch member 240 of the hydroformer 200 are placed above the rotor core 10 and the shaft 20. The pressing member 230 has a cylindrical shape. The seal punch member 240 has a columnar shape. The seal punch member 240 is placed radially inward of the pressing member 230. As illustrated in FIG. 7, the pressing member 230 and the seal punch member 240 are then both moved downward with respect to the rotor core 10 and the shaft 20. A lower surface 231 of a radially inward portion of the pressing member 230 thus comes into contact with the surface 71a of the step portion 71 of the shaft 20. A lower surface 241 of the seal punch member 240 comes into contact with an upper end face 22 of the shaft 20. The pressing member 230 is an example of a "die member" in the claims.

Figure 8:
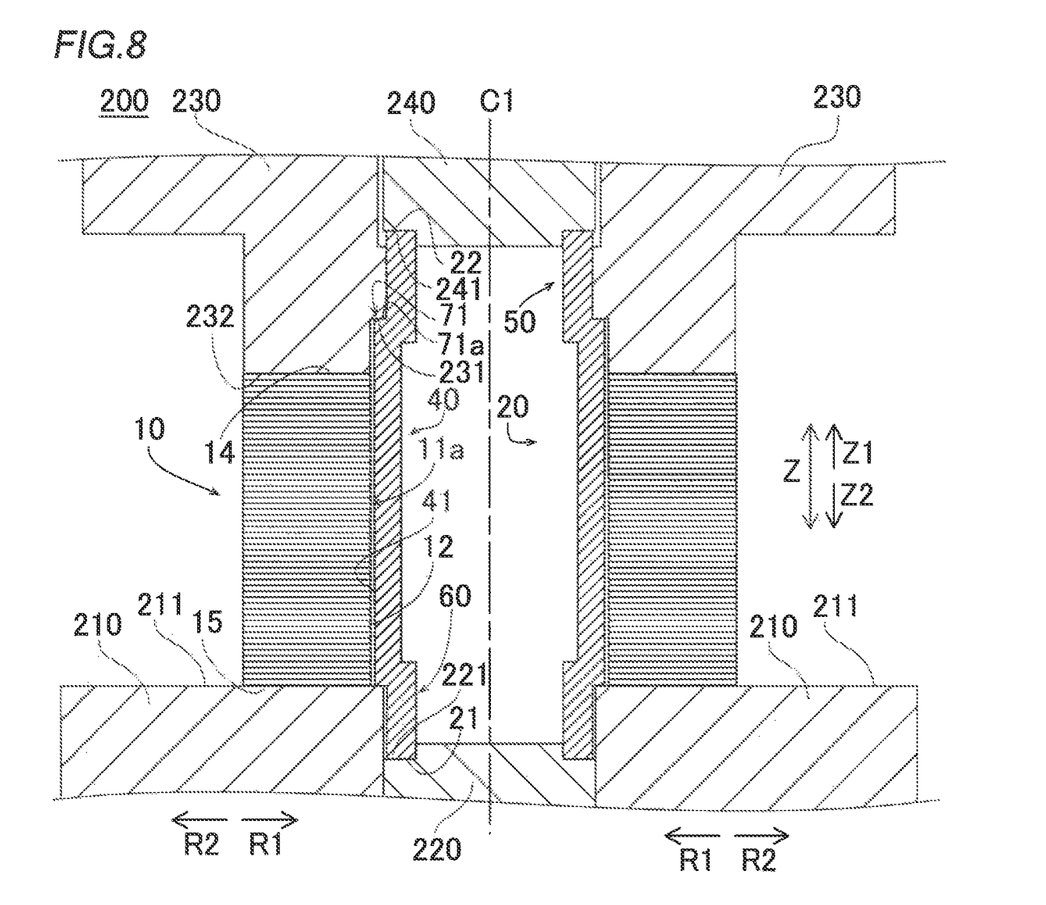
FIG. 8 is a diagram illustrating the intermediate step of fixing the shaft according to the first embodiment to the rotor core.

As illustrated in FIG. 8, the first embodiment involves fixing the shaft 20 to the rotor core 10 by hydroforming, with the pressing member 230 in contact with both of the step portion 71 and an end face 14 of the rotor core 10 facing in the rotation axis direction. To be more specific, moving the pressing member 230 relative to the rotor core 10 and the shaft 20 brings the lower surface 231 of the radially inward portion of the pressing member 230 into contact with the surface 71a of the step portion 71 parallel to the direction perpendicular to the axial direction, and brings a lower surface 232 of a radially outward portion of the pressing member 230 into contact with the end face 14 of the rotor core 10.

The axial position of the rotor core 10 is thus fixed by the lower die 210 and the pressing member 230. With the axial position of the rotor core 10 fixed by the lower die 210 and the pressing member 230, the shaft 20 is sandwiched between the lifter 220 and the seal punch member 240 in the axial direction. In this state, moving the lifter 220, pressing member 230, and the seal punch member 240 downward moves the shaft 20 downward relative to the rotor core 10. Consequently, as illustrated in FIG. 8, the first portion 40 of the shaft 20 radially faces an entirety of the inner peripheral surface 12 of the rotor core 10.

Figure 9:
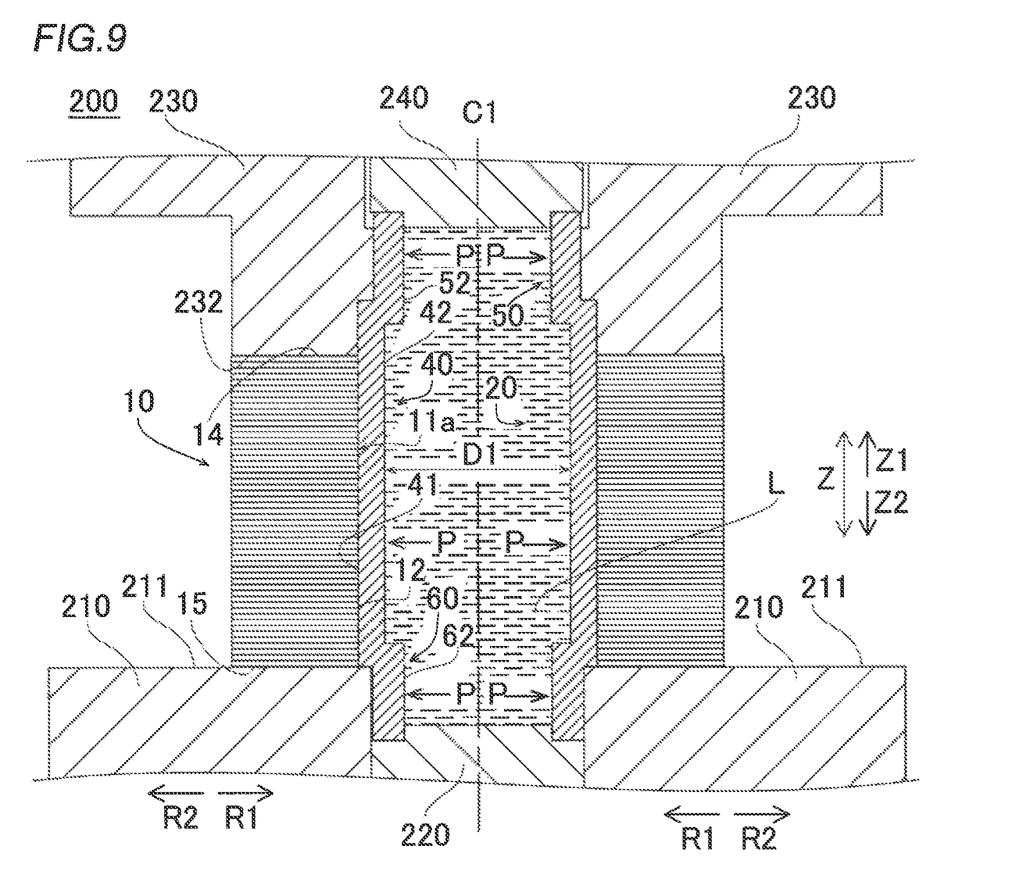
FIG. 9 is a diagram illustrating the final step of fixing the shaft according to the first embodiment to the rotor core.

As illustrated in FIG. 9, the hydroformer 200 injects the fluid into the internal space of the shaft 20 (i.e., an internal space of the shaft 20 defined by the inner peripheral surfaces 42, 52, and 62) with a predetermined pressure P so as to pressurize the internal space of the shaft 20. The predetermined pressure P is as high as a few or several hundred megapascals at which the first portion 40 of the shaft 20 is plastically deformable and the rotor core 10 is elastically deformed. In other words, the predetermined pressure P is a pressure at which the shaft 20 is fixable to the rotor core 10. The inside diameter D22 of the first portion 40 thus increases to the inside diameter D1 so as to remove the clearance CL1.

When a cylindrical member is subjected to hydroforming, a circumferential stress $\sigma_\theta$ applied to the member is representable by the following relational expression (2):

$$\sigma_\theta = (P \times D)/t \qquad (2)$$

where P denotes a pressure (internal pressure), D denotes an inside diameter, and t denotes a thickness.

Because the inside diameter D1 of the first portion 40 is larger than the inside diameter D2 of each of the second portions 50 and 60, it is evident from the relational expression (2) that a circumferential stress $\sigma_{\theta 1}$ applied to the inner peripheral surface 42 of the first portion 40 will be greater than a circumferential stress $\sigma_{\theta 2}$ applied to the inner peripheral surface 52 of the second portion 50 and the inner peripheral surface 62 of the second portion 60. Accordingly, the inner peripheral surface 42 of the first portion 40 expands such that its circumferential length increases, resulting in radially outward expansion of the first portion 40. Although the second portion 50 also expands radially outward, the degree of deformation of the second portion 50 is lower than the degree of deformation of the first portion 40.

Pressing the rotor core 10 radially outward with the first portion 40 causes the rotor core 10 to elastically deform such that the rotor core 10 expands radially outward, and causes the first portion 40 to plastically deform such that the first portion 40 expands radially outward. The fluid in the internal space of the shaft 20 is then removed, which causes the rotor core 10 to contract radially inward and return to the shape the rotor core 10 had before its elastic deformation, and causes the second portion 50 to contract radially inward and return to the shape the second portion 50 had before its elastic deformation. The plastically deformed first portion 40 is thus pressure-welded (or interference-fitted) to the radially inwardly contracted rotor core 10. Consequently, the shaft 20 is fixed to the rotor core 10 as illustrated in FIG. 1.

In the first embodiment, the inner peripheral surface 42 of the first portion 40 remains recessed relative to the inner peripheral surface 52 of the second portion 50 after hydroforming. In other words, the first portion 40 is provided with the recess 43 after hydroforming. During use of the rotor 100, the cooling fluid (ATF) flowing axially through the internal space of the shaft 20 is stored in the recess 43, enhancing the ability to cool the rotor core 10. The rotor core 10 and the shaft 20 are then removed from the hydroformer 200.

As illustrated in FIG. 1, step S5 involves placing the bearing members 31 and 32 around the shaft 20. Specifically, the bearing member 31 is placed around the outer peripheral surface 51 of the second portion 50, and the bearing member 32 is placed around the outer peripheral surface 61 of the second portion 60. To be more specific, the bearing member 31 is placed in contact with the surface 71a of the step portion 71, and the bearing member 32 is placed in contact with the surface 72a of the step portion 72. This completes the manufacture of the rotor 100. A stator is then placed radially outward of the rotor 100 so as to manufacture a rotary electric machine.

Second Embodiment

Figure 10:
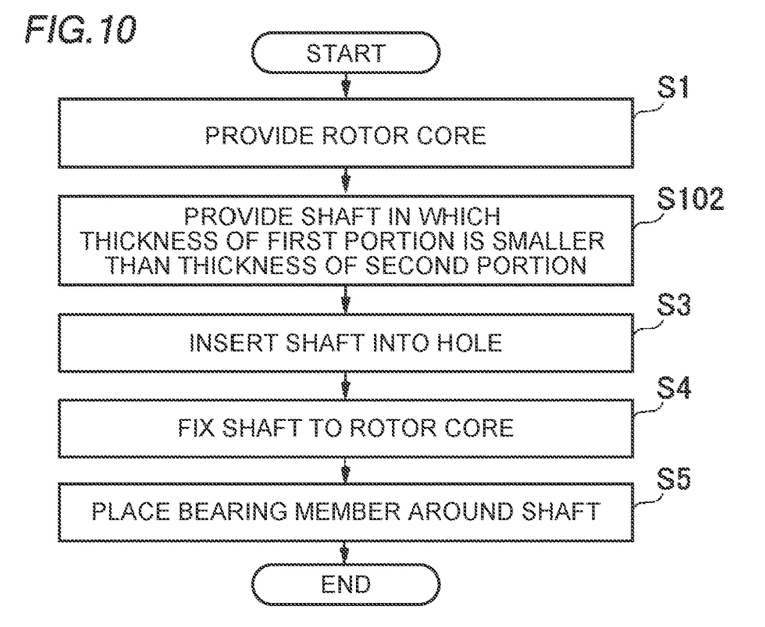
FIG. 10 is a flow chart illustrating rotor manufacturing steps according to a second embodiment.
Figure 11:
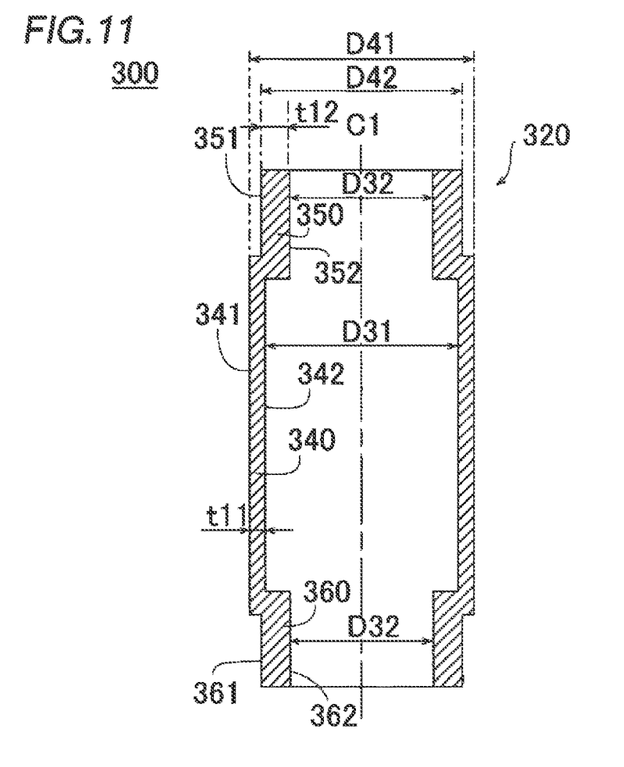
FIG. 11 is a cross-sectional view of a shaft according to the second embodiment, illustrating the step of providing the shaft.

Referring to FIGS. 10 and 11, a method for manufacturing a rotor 300 according to a second embodiment will now be described. Unlike the manufacturing method according to the first embodiment that involves providing the shaft 20 in which the thickness t1 of the first portion 40 is substantially equal to the thickness t2 of each of the second portions 50 and 60, the method for manufacturing the rotor 300 according to the second embodiment involves providing a shaft 320 in which a thickness t11 of a first portion 340 is smaller than a thickness t12 of each of second portions 350 and 360. Specifically, as illustrated in FIG. 10, the manufacturing method according to the second embodiment involves performing step S102 instead of step S2 illustrated in FIG. 3.

In the second embodiment, step S102 involves providing the shaft 320. Specifically, step S102 involves providing the shaft 320 including: the first portion 340 having an inside diameter D31, an outside diameter D41, and the thickness t11; and the second portions 350 and 360 each having an inside diameter D32, an outside diameter D42, and the thickness t12. In the present embodiment, the thickness t11 is smaller than the thickness t12. The inside diameter D31 is larger than the inside diameter D32. The outside diameter D41 is larger than the outside diameter D42. An outer periphery 341 of the first portion 340 is located radially outward of an outer periphery 351 of the second portion 350 and radially outward of an outer periphery 361 of the second portion 360.

Because the thickness t11 of the first portion 340 is smaller than the thickness t12 of each of the second portions 350 and 360, it is evident from the relational expression (2) that a circumferential stress $\sigma_{\theta11}$ applied to an inner peripheral surface 342 of the first portion 340 will be greater than a circumferential stress $\sigma_{\theta12}$ applied to an inner peripheral surface 352 of the second portion 350 and an inner peripheral surface 362 of the second portion 360. Accordingly, the inner peripheral surface 342 of the first portion 340 expands such that its circumferential length increases, resulting in radially outward expansion of the first portion 340. The degree of radially outward expansion of the second portion 350 is smaller than the degree of radially outward expansion of the first portion 340. Other steps included in the manufacturing method according to the second embodiment are similar to the corresponding steps (i.e., step S1 and steps S3 to S5) included in the manufacturing method according to the first embodiment.

Effects of First and Second Embodiments

The first and second embodiments are able to achieve effects described below.

As described above, the manufacturing methods according to the first and second embodiments each include the step (S2, S102) of providing a shaft (20, 320) having a cylindrical shape in which an inside diameter (D1, D31) of a first portion (40, 340) to be placed on the inner peripheral surface (12) of the shaft insertion hole (11a) is larger than an inside diameter (D2, D32) of a second portion (50, 60, 350, 360) located on one side in a rotation axis direction relative to the first portion (40, 340). Because the inside diameter (D1, D31) of the first portion (40, 340) is larger than the inside diameter (D2, D32) of the second portion (50, 60, 350, 360), a circumferential stress ($\sigma_{\theta1}$, $\sigma_{\theta11}$) applied to the first portion (40, 340) of the shaft (20, 320) will be greater than a circumferential stress ($\sigma_{\theta2}$, $\sigma_{\theta12}$) applied to the second portion (50, 60, 350, 360) accordingly. Thus, when an internal pressure produced by a fluid (L) is increased to a predetermined pressure (P) by a hydroformer (200), the same internal pressure (P) is applied to the first portion (40, 340) and the second portion (50, 60, 350, 360), which makes it likely that the first portion (40, 340) having a relatively large inside diameter (D1, D31) will expand (or deform) to a greater degree than the second portion (50, 60, 350, 360). In other words, the second portion (50, 60, 350, 360) having a relatively small inside diameter (D2, D32) is unlikely to deform (or plastically deform) to a greater degree than the first portion (40, 340). As a result, the manufacturing methods are able to make the second portion (50, 60, 350, 360) less prone to deform without increasing a radial thickness (t1, t2, t11, t12) of an entirety of the shaft (20, 320). Consequently, if the manufacturing methods involve performing hydroforming, the manufacturing methods would be able to prevent a decrease in the dimensional accuracy of the second portion (50, 60, 350, 360), which is the portion (50, 60) of the shaft (20, 320) located on one side in the rotation axis direction relative to the shaft insertion hole (11a), while keeping a manufacturing apparatus (200) for a rotor (100, 300) from increasing in size.

In the first and second embodiments, the step (S4) of fixing the shaft (20, 320) to the rotor core (10) involves fixing the shaft (20, 320) to the rotor core (10) by the hydroforming process such that an inner peripheral surface (42, 342) of the first portion (40, 340) remains recessed relative to an inner peripheral surface (52, 62, 352, 362) of the second portion (50, 60, 350, 360) after the hydroforming process has been performed. This enables a cooling fluid to be stored in a recess (43) of the shaft (20, 320) during use of the rotor (100). The cooling fluid stored in the recess (43) is thus able to cool the rotor core (10) through the second portion (50, 60, 350, 360).

In the first and second embodiments, the step (S2, S102) of providing the shaft (20, 320) involves providing the shaft (20, 320) in which a radial thickness (t1, t11) of the first portion (40, 340) is equal to or smaller than a radial thickness (t2, t12) of the second portion (50, 60, 350, 360). Suppose that an internal space of the cylindrical shaft (20, 320) is filled with the fluid (L) so as to expand the shaft (20, 320) with the internal pressure (P) produced by the fluid (L). In this case, as indicated by the relational expression (2), a circumferential stress ($\sigma_\theta$) applied to the shaft (20, 320) has a tendency to decrease as a thickness (t) of the shaft (20, 320) increases and to increase as the thickness (t) decreases. Focusing attention on this point, the inventors of the present application have found that the manufacturing methods according to the first and second embodiments are able to make the circumferential stress ($\sigma_{\theta1}$, $\sigma_{\theta11}$), which is applied to the first portion (40, 340), greater than when the radial thickness (t1, t11) of the first portion (40, 340) is larger than the radial thickness (t2, t12) of the second portion (50, 60, 350, 360). The manufacturing methods according to the first and second embodiments are thus able to prevent an increase in the internal pressure (P) necessary to expand the first portion (40, 340). Consequently, because the necessary internal pressure (P) is kept from increasing, the manufacturing methods according to the first and second embodiments are able to prevent an increase in the degree of deformation of the second portion (50, 60, 350, 360) accordingly.

In the second embodiment, the step (S102) of providing the shaft (320) involves providing the shaft (320) in which the radial thickness (t11) of the first portion (340) is smaller than the radial thickness (t12) of the second portion (350, 360). Thus, as the thickness (t11) of the first portion (340) decreases, the circumferential stress ($\sigma_{\theta 11}$) applied to the first portion (340) increases accordingly as indicated by the relational expression (2). The first portion (340) is thus expandable by a relatively low internal pressure (P), so that as the necessary internal pressure (P) decreases, the degree of deformation of the second portion (350, 360) further decreases accordingly. Consequently, the manufacturing method according to the second embodiment is able to further increase the dimensional accuracy of the second portion (350, 360).

In the first embodiment, the step (S2) of providing the shaft (20) involves providing the shaft (20) in which the radial thickness (t1) of the first portion (40) is equal to the radial thickness (t2) of the second portion (50, 60). This eliminates the need to machine the shaft (20) such that the radial thickness (t1) of the first portion (40) differs from the radial thickness (t2) of the second portion (50, 60). Consequently, the first embodiment is able to prevent an increase in the number of steps for manufacturing the rotor (100).

In the first and second embodiments, the step (S2, S102) of providing the shaft (20, 320) involves providing the shaft (20, 320) having a cylindrical shape in which an outside diameter (D11, D41) of the first portion (40, 340) is larger than an outside diameter (D12, D42) of the second portion (50, 60, 350, 360). In this case, a pipe member (20a) having constant inside and outside diameters is prepared and deformed such that its first portion (40, 340) expands radially outward or its second portion (50, 60, 350, 360) contracts radially inward. This facilitates providing the shaft (20, 320) having a cylindrical shape in which the inside diameter (D1, D31) of the first portion (40, 340) is larger than the inside diameter (D2, D32) of the second portion (50, 60, 350, 360).

In the first and second embodiments, the step (S2, S102) of providing the shaft (20, 320) involves providing the shaft (20, 320) having a cylindrical shape in which the outside diameter (D11, D41) of the first portion (40, 340) is larger than the outside diameter (D12, D42) of the second portion (50, 60, 350, 360). The shaft (20, 320) includes a step portion (71, 72) defined between the outer periphery (41, 341) of the first portion (40, 340) and an outer periphery (51, 61, 351, 361) of the second portion (50, 60, 350, 360). The step (S4) of fixing the shaft (20, 320) to the rotor core (10) involves fixing the shaft (20, 320) to the rotor core (10) by the hydroforming process, with a die member (230) in contact with both of the step portion (71, 72) and an end face (14) of the rotor core (10) facing in the rotation axis direction. The manufacturing methods according to the first and second embodiments each further include the step (S5) of placing a bearing member (31, 32) on the step portion (71, 72) after the step (S4) of fixing the shaft (20, 320). Thus, the die member (230) enables positioning of the rotor core (10) with respect to the step portion (71, 72) on which the bearing member (31, 32) needs to be placed with relatively high dimensional accuracy. Consequently, the manufacturing methods according to the first and second embodiments are able to increase the axial dimensional accuracy of the step portion (71, 72) while increasing the radial dimensional accuracy of the second portion (50, 60, 350, 360).

In the first and second embodiments, the step (S2, S102) of providing the shaft (20, 320) involves performing drawing on a pipe member (20a) in which the outer periphery (41, 341) of the first portion (40, 340) is flush with an outer periphery (51, 61, 351, 361) of the second portion (50, 60, 350, 360), so as to cause the outer periphery (51, 61, 351, 361) of the second portion (50, 60, 350, 360) to deform radially inward, thus providing the shaft (20, 320) having a cylindrical shape in which the outside diameter (D11, D41) of the first portion (40, 340) is larger than the outside diameter (D12, D42) of the second portion (50, 60, 350, 360). Thus, preparing the pipe member (20a) having constant inside and outside diameters and subjecting the pipe member (20a) to drawing facilitates providing the shaft (20, 320) having a cylindrical shape in which the outside diameter (D11, D41) of the first portion (40, 340) is larger than the outside diameter (D12, D42) of the second portion (50, 60, 350, 360).

The manufacturing methods according to the first and second embodiments each further include the step (S1) of providing the rotor core (10) such that surfaces of the electromagnetic steel sheets defining the inner peripheral surface (12) of the shaft insertion hole (11a) are flush with each other in the rotation axis direction before the step of inserting the shaft (20, 320). Thus, the resulting rotor core (10) has a simpler structure than a rotor core (10) having a relatively complicated shape in which surfaces defining an inner peripheral surface (12) of a shaft insertion hole (11a) are not flush with each other. Consequently, the manufacturing methods according to the first and second embodiments are able to facilitate providing the rotor core (10).

Variations

The embodiments disclosed herein are to be considered as not limitative but illustrative in all respects. The scope of the present disclosure is defined not by the description of the above embodiments but by the claims and includes all changes (or variations) falling within the meaning and range equivalent to the claims.

Figure 12:
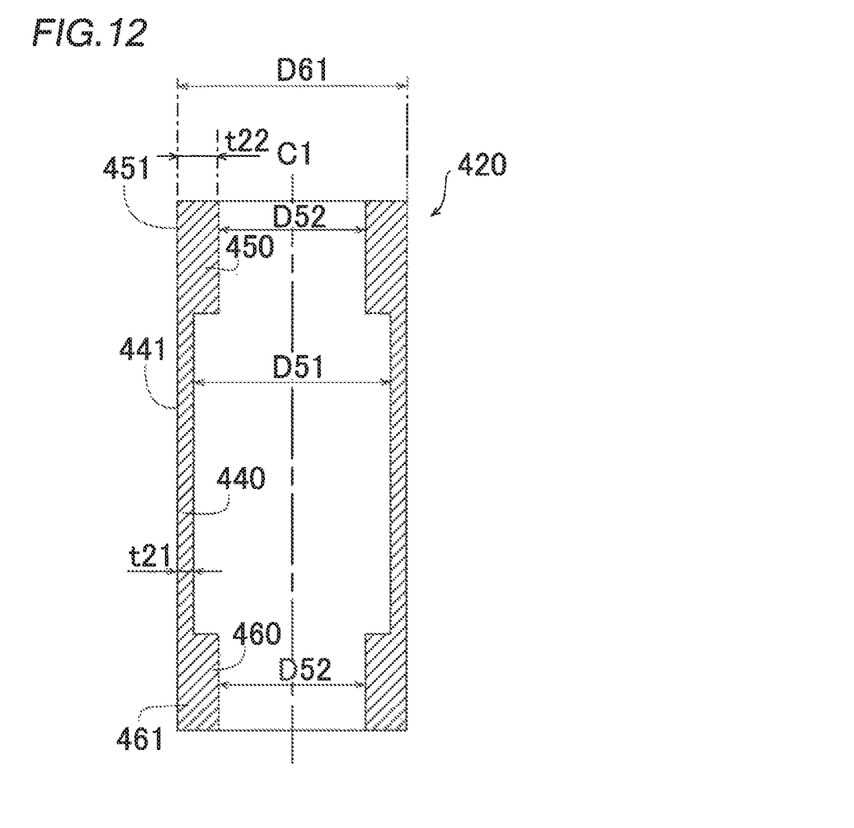
FIG. 12 is a cross-sectional view of a shaft according to a variation of the first and second embodiments, illustrating the step of providing the shaft.

The first and second embodiments, for example, have illustrated an example where steps S2 and S102 each involve providing the shaft in which the outside diameter of the first portion is larger than the outside diameter of each second portion. The present disclosure, however, is not limited to this example. One variation illustrated in FIG. 12, for example, may involve providing a shaft 420 in which an outside diameter D61 of a first portion 440 is substantially equal to an outside diameter D61 of each of second portions 450 and 460. In this case, a thickness t21 of the first portion 440 is made smaller than a thickness t22 of each of the second portions 450 and 460 by making an inside diameter D51 of the first portion 440 smaller than an inside diameter D52 of each of the second portions 450 and 460. Such a variation makes it possible to reduce the degree of deformation of the second portion 450 during fixation of the shaft 420 to the rotor core.

The first and second embodiments have illustrated an example where the shaft is provided with the step portions. The present disclosure, however, is not limited to this example. The variation illustrated in FIG. 12, for example, may involve providing the shaft 420 including no step portions such that an outer peripheral surface 441 of the first portion 440 of the shaft 420 is flush with an outer peripheral surface 451 of the second portion 450 and an outer peripheral surface 461 of the second portion 460.

The first and second embodiments have illustrated an example where the bearing members are placed around the second portions. The present disclosure, however, is not limited to this example. In an alternative example, resolver(s) may be placed around the second portion(s).

The first and second embodiments have illustrated an example where the second portion located in the direction Z1 is substantially identical in shape to the second portion located in the direction Z2. The present disclosure, however, is not limited to this example. An alternative example may involve providing the second portion located in the direction Z2 such that the radial thickness of the second portion located in the direction Z2 is larger than the radial thickness of the second portion located in the direction Z1.

The first and second embodiments have illustrated an example where the ATF is allowed to flow through the internal space of the shaft. The present disclosure, however, is not limited to this example. An alternative example may involve placing an additional member in the internal space of the shaft.

The first and second embodiments have illustrated an example where the manufacturing methods each involve performing drawing in providing the shaft having a cylindrical shape in which the outside diameter of the first portion is larger than the outside diameter of each second portion. The present disclosure, however, is not limited to this example. An alternative example may involve cutting the outer peripheral surface of each second portion, thus providing the shaft having a cylindrical shape in which the outside diameter of the first portion is larger than the outside diameter of each second portion.

The first and second embodiments have illustrated an example where the manufacturing methods each involve providing the rotor core such that surfaces of the electromagnetic steel sheets defining the inner peripheral surface of the hole of the rotor core are flush with each other in the axial direction. The present disclosure, however, is not limited to this example. An alternative example may involve forming irregularities (or keys) in the inner peripheral surface of the hole of the rotor core.

The first and second embodiments have illustrated an example where the pressing member comes into contact with both of the step portion of the shaft and the rotor core. The present disclosure, however, is not limited to this example. In an alternative example, the pressing member may come into contact with the rotor core without coming into contact with the step portion of the shaft.

DESCRIPTION OF THE REFERENCE NUMERALS 10 rotor core
11 electromagnetic steel sheet
11a hole (shaft insertion hole)
12 inner peripheral surface (inner peripheral surface of shaft insertion hole)
14 end face (end face of rotor core facing in rotation axis direction)
20, 320, 420 shaft
31, 32 bearing member
40, 340, 440 first portion
41, 441 outer peripheral surface (outer periphery of first portion)
42, 342 inner peripheral surface (inner peripheral surface of first portion)
43 recess
50, 60, 350, 360, 450, 460 second portion
51, 61, 451, 461 outer peripheral surface (outer periphery of second portion)
52, 62, 362 inner peripheral surface (inner peripheral surface of second portion)
71, 72 step portion
100, 300 rotor
230 pressing member (die member)

The invention claimed is:

1. A rotor manufacturing method involving fixing a shaft to an inner peripheral surface of a shaft insertion hole of a rotor core including a plurality of annular electromagnetic steel sheets stacked in a rotation axis direction such that the shaft insertion hole is defined, the method comprising the steps of:
providing the shaft having a cylindrical shape in which an inside diameter of a first portion of the shaft to be placed on the inner peripheral surface of the shaft insertion hole is larger than an inside diameter of a second portion of the shaft located on one side in the rotation axis direction relative to the first portion;
inserting the shaft into the shaft insertion hole by axially moving at least one of the shaft and the rotor core such that an outer periphery of the first portion of the shaft radially faces the inner peripheral surface of the shaft insertion hole; and
fixing the shaft to the rotor core by a hydroforming process that involves filling an internal space of the shaft with a fluid and expanding the shaft with an internal pressure produced by the fluid, thus pressure-welding the first portion to the inner peripheral surface of the shaft insertion hole after the step of inserting the shaft.

2. The rotor manufacturing method according to claim 1, wherein
the step of fixing the shaft to the rotor core involves fixing the shaft to the rotor core by the hydroforming process such that an inner peripheral surface of the first portion remains recessed relative to an inner peripheral surface of the second portion after the hydroforming process has been performed.

3. The rotor manufacturing method according to claim 2, wherein
the step of providing the shaft involves providing the shaft in which a radial thickness of the first portion is equal to or smaller than a radial thickness of the second portion.

4. The rotor manufacturing method according to claim 3, wherein
the step of providing the shaft involves providing the shaft in which the radial thickness of the first portion is smaller than the radial thickness of the second portion.

5. The rotor manufacturing method according to claim 3, wherein
the step of providing the shaft involves providing the shaft in which the radial thickness of the first portion is equal to the radial thickness of the second portion.

6. The rotor manufacturing method according to claim 2, wherein
the step of providing the shaft involves providing the shaft having a cylindrical shape in which an outside diameter of the first portion is larger than an outside diameter of the second portion.

7. The rotor manufacturing method according to claim 6, wherein
the step of providing the shaft involves providing the shaft having a cylindrical shape in which the outside diameter of the first portion is larger than the outside diameter of the second portion, the shaft including a step portion defined between the outer periphery of the first portion and an outer periphery of the second portion,
the step of fixing the shaft to the rotor core involves fixing the shaft to the rotor core by the hydroforming process, with a die member in contact with both of the step portion and an end face of the rotor core facing in the rotation axis direction, and the method further comprises the step of placing a bearing member on the step portion after the step of fixing the shaft.

8. The rotor manufacturing method according to claim 2, further comprising the step of providing the rotor core such that surfaces of the electromagnetic steel sheets defining the inner peripheral surface of the shaft insertion hole are flush with each other in the rotation axis direction before the step of inserting the shaft.

9. The rotor manufacturing method according to claim 1, wherein the step of providing the shaft involves providing the shaft in which a radial thickness of the first portion is equal to or smaller than a radial thickness of the second portion.

10. The rotor manufacturing method according to claim 9, wherein the step of providing the shaft involves providing the shaft in which the radial thickness of the first portion is smaller than the radial thickness of the second portion.

11. The rotor manufacturing method according to claim 9, wherein the step of providing the shaft involves providing the shaft in which the radial thickness of the first portion is equal to the radial thickness of the second portion.

12. The rotor manufacturing method according to claim 1, wherein the step of providing the shaft involves providing the shaft having a cylindrical shape in which an outside diameter of the first portion is larger than an outside diameter of the second portion.

13. The rotor manufacturing method according to claim 12, wherein the step of providing the shaft involves providing the shaft having a cylindrical shape in which the outside diameter of the first portion is larger than the outside diameter of the second portion, the shaft including a step portion defined between the outer periphery of the first portion and an outer periphery of the second portion, the step of fixing the shaft to the rotor core involves fixing the shaft to the rotor core by the hydroforming process, with a die member in contact with both of the step portion and an end face of the rotor core facing in the rotation axis direction, and the method further comprises the step of placing a bearing member on the step portion after the step of fixing the shaft.

14. The rotor manufacturing method according to claim 13, wherein the step of providing the shaft involves performing drawing on a pipe member in which the outer periphery of the first portion is flush with an outer periphery of the second portion, so as to cause the outer periphery of the second portion to deform radially inward, thus providing the shaft having a cylindrical shape in which the outside diameter of the first portion is larger than the outside diameter of the second portion.

15. The rotor manufacturing method according to claim 12, wherein the step of providing the shaft involves performing drawing on a pipe member in which the outer periphery of the first portion is flush with an outer periphery of the second portion, so as to cause the outer periphery of the second portion to deform radially inward, thus providing the shaft having a cylindrical shape in which the outside diameter of the first portion is larger than the outside diameter of the second portion.

16. The rotor manufacturing method according to claim 1, further comprising the step of providing the rotor core such that surfaces of the electromagnetic steel sheets defining the inner peripheral surface of the shaft insertion hole are flush with each other in the rotation axis direction before the step of inserting the shaft.

* * * * *